(12) United States Patent
Sekiya

(10) Patent No.: US 8,977,466 B2
(45) Date of Patent: Mar. 10, 2015

(54) VEHICLE BRAKE FLUID PRESSURE CONTROLLER

(71) Applicant: Nissin Kogyo Co., Ltd., Nagano (JP)

(72) Inventor: Tomoaki Sekiya, Nagano (JP)

(73) Assignee: Nissin Kogyo Co., Ltd., Nagano (JP)

( * ) Notice: Subject to any disclaimer, the term of this patent is extended or adjusted under 35 U.S.C. 154(b) by 190 days.

(21) Appl. No.: 13/721,507

(22) Filed: Dec. 20, 2012

(65) Prior Publication Data

US 2013/0166167 A1 Jun. 27, 2013

(30) Foreign Application Priority Data

Dec. 22, 2011 (JP) .................................. 2011-281102
Dec. 22, 2011 (JP) .................................. 2011-281182

(51) Int. Cl.
*G06F 17/00* (2006.01)
*G06F 19/00* (2011.01)
*B60T 8/34* (2006.01)
*B60T 8/50* (2006.01)
*B60T 8/1761* (2006.01)
*B60T 8/36* (2006.01)
*B60T 8/42* (2006.01)

(52) U.S. Cl.
CPC ............... *B60T 8/1761* (2013.01); *B60T 8/34* (2013.01); *B60T 8/17616* (2013.01); *B60T 8/3655* (2013.01); *B60T 8/4275* (2013.01); *B60T 8/50* (2013.01)
USPC ............................. 701/71; 701/78; 303/113.1

(58) Field of Classification Search
USPC ................. 701/36, 45, 48, 70, 71, 78, 82, 83; 303/121, 113.1, 113.3, 113.5, 114.1, 303/115.2, 116.1, 116.2
See application file for complete search history.

(56) References Cited

U.S. PATENT DOCUMENTS 6,010,198 A * 1/2000 Nakazawa ................. 303/113.1

FOREIGN PATENT DOCUMENTS

| JP | 02014954 | 1/1990 |
| JP | 06255468 | 9/1994 |
| JP | 10035464 | 2/1998 |
| JP | 11-180281 | 6/1999 |
| JP | 2009-023468 | 5/2009 |
| JP | 2011084243 | 4/2011 |

OTHER PUBLICATIONS

Japanese Office Action dated Oct. 29, 2013, 6 pages.

* cited by examiner

*Primary Examiner* — Thomas Tarcza
*Assistant Examiner* — Edward Pipala
(74) *Attorney, Agent, or Firm* — Andrew M. Calderon; Roberts Mlotkowski Safran & Cole, P.C.

(57) ABSTRACT

Embodiments disclose a vehicle brake fluid pressure controller. The controller includes: a normally-open proportional solenoid valve provided in a hydraulic passage extending from a hydraulic pressure source to a wheel brake; a normally-closed solenoid valve provided in a hydraulic passage extending from the wheel brake to the hydraulic pressure source; an antilock brake control module configured to perform an antilock brake control for suppressing the locking of a wheel by performing a pressure increase control, a pressure decrease control and a pressure holding control for a hydraulic pressure of the wheel brake, using the normally-open proportional solenoid valve and the normally-closed solenoid valve.

20 Claims, 15 Drawing Sheets

FIG. 9
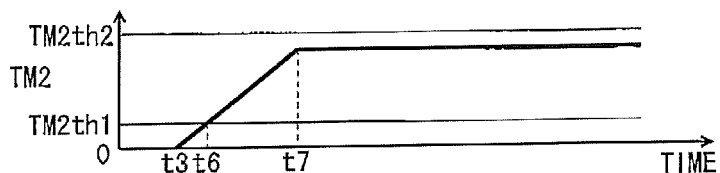
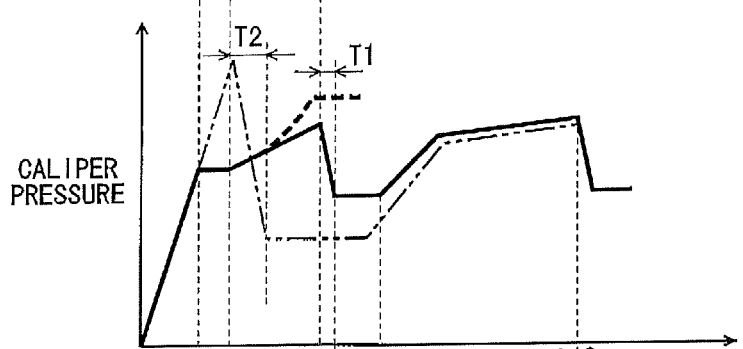
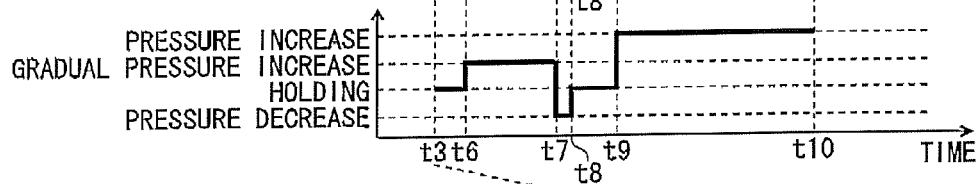
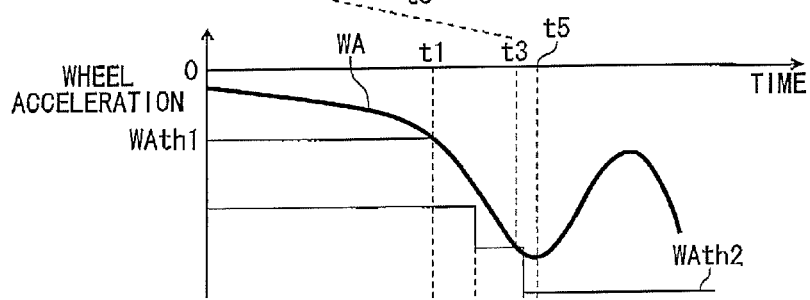
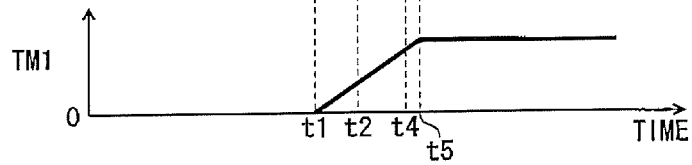

FIG. 12

| SUDDEN PRESSURE INCREASE RATIO CALCULATION TABLE | | | | | |
|---|---|---|---|---|---|
| | | PRESSURE INCREASE TIME OF THE LAST TIME | | | |
| | | <T1 | <T2 | <T3 | ≥T4 |
| PRESSURE DECREASE AMOUNT OF THE LAST TIME | <ΔP1 | α1 | 0 | -α1 | -α1 |
| | <ΔP2 | α2 | α1 | 0 | -α1 |
| | ≥ΔP3 | α3 | α2 | α1 | 0 |

VEHICLE BRAKE FLUID PRESSURE CONTROLLER

CROSS-REFERENCE TO RELATED APPLICATION(S)

This application claims priority (priorities) from Japanese Patent Application(s) No. 2011-281102 filed on Dec. 22, 2011, and No. 2011-281182 filed on Dec. 22, 2011, the entire contents of which are incorporated herein by reference.

FIELD

The present invention relates to a vehicle brake fluid pressure controller, and more particularly, to a vehicle brake fluid pressure controller in which the operation at the start time of antilock brake control is stabilized.

Furthermore, the present invention relates to a vehicle brake fluid pressure controller for controlling a normally-open proportional solenoid valve.

BACKGROUND

There is known a vehicle brake fluid pressure controller which performs, to suppress wheel locking, antilock brake (ABS) control in which the state of a wheel being likely to lock is judged on the basis of wheel velocity and the brake fluid pressure corresponding to the wheel being likely to lock is decreased. Also, for example, JP-H11-180281-A discloses a vehicle brake fluid pressure controller which performs braking force distribution control in which the brake fluid pressure on the side of the rear wheels is limited depending on the depressing speed of the brake pedal.

However, in the case that sudden braking is performed, the load of a vehicle is apt to be applied to the front wheels thereof, and the hydraulic pressure in the front brakes rises at the time when pressure decrease (ABS) control is started. Hence, when the front wheels are likely to lock after sudden braking, a pressure decrease amount until dissolving the locking state of the wheels increases. In addition, after this pressure decrease, the pressure is apt to increase suddenly. As a result, significantly large sudden pressure decrease and sudden pressure increase are repeated at the initial stage of the ABS control. Hence, the braking operation becomes unstable as such situation corresponds to a so-called overshooting situation (largely exceeding the target value of control) in the control engineering. When the hydraulic pressure balance between the front and rear wheels is adjusted by decreasing the hydraulic pressure of the rear wheels as in JP-H11-180281-A, the ratio of using the braking force of the front wheels is relatively large. Thus, such situation becomes more serious.

In addition, JP-2009-023468-A discloses a vehicle brake fluid pressure controller which performs sudden pressure increase control for increasing pressure at a steep inclination, and thereafter, performs gradual pressure increase control for increasing pressure at a gentle inclination is performed. In JP-2009-023468-A, a normally-open proportional solenoid valve is used. Hence, sudden pressure increase control is performed by steeply lowering the control current to the set break point current value, and gradual pressure increase control is performed by gently lowering the control current from the set break point current value.

In other words, this technology sets respective indication hydraulic pressures (target of the hydraulic pressure inside a wheel cylinder) for a period of controlling the hydraulic pressure with a steep inclination and for a period of controlling the hydraulic pressure with a gentle inclination.

However, even if the indication hydraulic pressure is raised at the steep inclination to perform the sudden pressure increase control, the actual hydraulic pressure may not respond as specified by the indication hydraulic pressure in some cases, and the inclination of the pressure increase may become slightly gentler than the inclination of the indication hydraulic pressure. Thus, the sudden pressure increase control in which the actual hydraulic pressure can be increased more quickly is desired.

SUMMARY

The present invention is intended to provide a vehicle brake fluid pressure controller in which the operation at the start time of antilock brake control is stabilized.

One aspect of the present invention provides a vehicle brake fluid pressure controller including:

a normally-open proportional solenoid valve provided in a hydraulic passage extending from a hydraulic pressure source to a wheel brake;

a normally-closed solenoid valve provided in a hydraulic passage extending from the wheel brake to the hydraulic pressure source;

an antilock brake control module configured to perform an antilock brake control for suppressing the locking of a wheel by performing a pressure increase control, a pressure decrease control and a pressure holding control for a hydraulic pressure of the wheel brake, using the normally-open proportional solenoid valve and the normally-closed solenoid valve; and a sudden braking judging module configured to judge whether a sudden braking is performed, wherein, in the case that the sudden braking judging module judges that the sudden braking is performed, the antilock brake control module:

fully closes the normally-open proportional solenoid valve for the front wheel brake during when the hydraulic pressure is being increased due to the sudden braking;

then performs the holding control for a first predetermined time; and then performs the pressure increase control at a predetermined inclination by applying a current to the normally-open proportional solenoid valve until the pressure decrease control is started.

With this configuration, in the case that the sudden braking judging module judges that sudden braking is performed, the normally-open proportional solenoid valve is fully closed when hydraulic pressure is being increased due to sudden braking, whereby the hydraulic pressure of the front wheel brake is held for the first predetermined time. This temporal holding control performed by fully closing the normally-open proportional solenoid valve can securely stop the flow of the brake fluid from the hydraulic pressure source and can securely perform the subsequent gradual pressure increase control. After the temporal holding control, the current to be applied to the normally-open proportional solenoid valve is controlled to restrict the brake fluid from flowing from the hydraulic pressure source to the wheel brake. Hence, the hydraulic pressure of the front brake is subjected to pressure increase control at a predetermined inclination, and ABS control can be performed while searching for the tendency of the locking state of the wheel. Since the hydraulic pressure in the front wheel brake can be suppressed from rising suddenly at the time of sudden braking as described above, the fluctuations of the brake fluid pressure at the start time of the ABS control can be made small and the operation of the control can be stabilized.

There may be provided, based on the above configuration, the controller, wherein the predetermined inclination is adjusted to become gradually steeper.

Since the predetermined inclination is set so as to become gradually steeper with the passage of time, the control can easily enter into the pressure decrease control regardless of the brake fluid pressure of the front wheel at the time when the control entered into the temporal holding control (for example, even if the temporal holding control is performed at low brake fluid pressure).

There may be provided, based on the above configuration, the controller, wherein, in the case that the pressure decrease control is not performed even after a second predetermined time has passed after the pressure increase control is started at the predetermined inclination, the antilock brake control module fully opens the normally-open proportional solenoid valve.

With this configuration, in the case that the pressure decrease control is not performed even after the second predetermined time has passed after the pressure increase control is started at the predetermined inclination, the normally-open proportional solenoid valve is fully opened. Hence, even if a mistake is made in the judgment of sudden braking, ordinary braking force can be generated.

There may be provided, based on the above configuration, the controller, wherein the sudden braking judging module judges whether the sudden braking is performed on the basis of a change in a wheel velocity.

With this configuration, a judgment as to whether sudden braking is performed can be made without using a sensor or the like for detecting the depressing amount of the pedal.

There may be provided, based on the above configuration, the controller, wherein the sudden braking judging module judges whether the sudden braking is performed on the basis of whether a wheel deceleration exceeds a threshold value, while changing the threshold value to a side in which the wheel deceleration becomes larger in an absolute value depending on a time elapsed from when the wheel deceleration reaches a predetermined value in the absolute value.

With this configuration, the sudden braking judging module can accurately judge whether sudden braking is performed on the basis of the change in wheel deceleration.

That is, with the above-mentioned configurations, the fluctuations in the brake fluid pressure at the start time of the ABS control can be made small and the operation of the control can be stabilized by suppressing the hydraulic pressure of the front brake from suddenly rising at the time of sudden braking.

In addition, the present invention is intended to provide a vehicle brake fluid pressure controller capable of more quickly raising the hydraulic pressure in the sudden pressure increase control.

Another aspect of the present invention provides a vehicle brake fluid pressure controller including:

a normally-open proportional solenoid valve provided in a hydraulic passage extending from a hydraulic pressure source to a wheel brake;

a normally-closed solenoid valve provided in a hydraulic passage extending from the wheel brake to the hydraulic pressure source; and an antilock brake control module configured to perform an antilock brake control for suppressing the locking of a wheel by performing a pressure increase control, a pressure decrease control and a pressure holding control for a hydraulic pressure of the wheel brake, using the normally-open proportional solenoid valve and the normally-closed solenoid valve, wherein, in the pressure increase control, the antilock brake control module performs a sudden pressure increase control for raising the hydraulic pressure at a first inclination until it reaches a break point target value and performs a gradual pressure increase control for raising the hydraulic pressure at a second inclination gentler than the first inclination after it has reached the break point target value, and wherein, at a start time of the sudden pressure increase control, the antilock brake control module sets an indication hydraulic pressure for controlling the normally-open proportional solenoid valve to a locking-equivalent hydraulic pressure which is equivalent to the hydraulic pressure at a start time of the pressure decrease control of the last time.

With this configuration, since the indication hydraulic pressure at the start time of the sudden pressure increase control is set to the locking-equivalent hydraulic pressure that is equivalent to the hydraulic pressure at the start time of the pressure decrease control of the last time, the hydraulic pressure can be increased more quickly in the sudden pressure increase control.

There may be provided, based on the above configuration, the controller, wherein, in the case that a difference between the hydraulic pressure at the start time of the sudden pressure increase control and the locking-equivalent hydraulic pressure is equal to or more than a predetermined limit value at the start time of the sudden pressure increase control, the antilock brake control module limits the indication hydraulic pressure to a value obtained by adding a limit value to the hydraulic pressure at the start time of the sudden pressure increase control.

With this configuration, since the indication hydraulic pressure can be limited from increasing excessively by the limit value, the hydraulic pressure can be limited to an appropriate pressure increase amount in the case that excessive pressure increase is likely to occur.

There may be provided, based on the above configuration, the controller, wherein, in the case that a time in which the pressure increase control of the last time is performed is shorter than a predetermined time, the antilock brake control module makes the locking-equivalent hydraulic pressure to be lower than the hydraulic pressure at the start time of the pressure decrease control of the last time.

With this configuration, in the case that the time for the pressure increase control of the last time is shorter than the predetermined time, the locking-equivalent hydraulic pressure is made lower than the hydraulic pressure at the start time of the pressure decrease control of the last time. Hence, the inclination of the actual hydraulic pressure increased by the sudden pressure increase control of this time can be made gentler than that of the last time, whereby excessive pressure increase due to various factors, such as the breakdown of a pressure sensor, can be suppressed.

There may be provided, based on the above configuration, the controller, wherein, in the case that a pressure decrease amount in the pressure decrease control of the last time is larger than a predetermined value, the antilock brake control module makes the locking-equivalent hydraulic pressure to be lower than the hydraulic pressure at the start time of the pressure decrease control of the last time.

With this configuration, in the case that the pressure decrease amount in the pressure decrease control of the last time is larger than the predetermined value, the locking-equivalent hydraulic pressure is made lower than the hydraulic pressure at the start time of the pressure decrease control of the last time. Hence, the inclination of the actual hydraulic pressure increased by the sudden pressure increase control of this time can be made gentler than that of the last time, whereby excessive pressure increase due to various factors, such as the breakdown of a pressure sensor, can be suppressed.

That is, with the above-mentioned configurations, the hydraulic pressure can be increased more quickly in the sudden pressure increase control.

BRIEF DESCRIPTION OF DRAWINGS

FIGS. 9(a), 9(b), 9(c), 9(d) and 9(e) show time charts indicating the changes of count value TM2, caliper pressure, pressure control state, wheel acceleration and count value TM1, respectively.

FIG. 12 shows a sudden pressure increase ratio calculation table.

DETAILED DESCRIPTION (First Embodiment)

A first embodiment will be described below.

Figure 1:
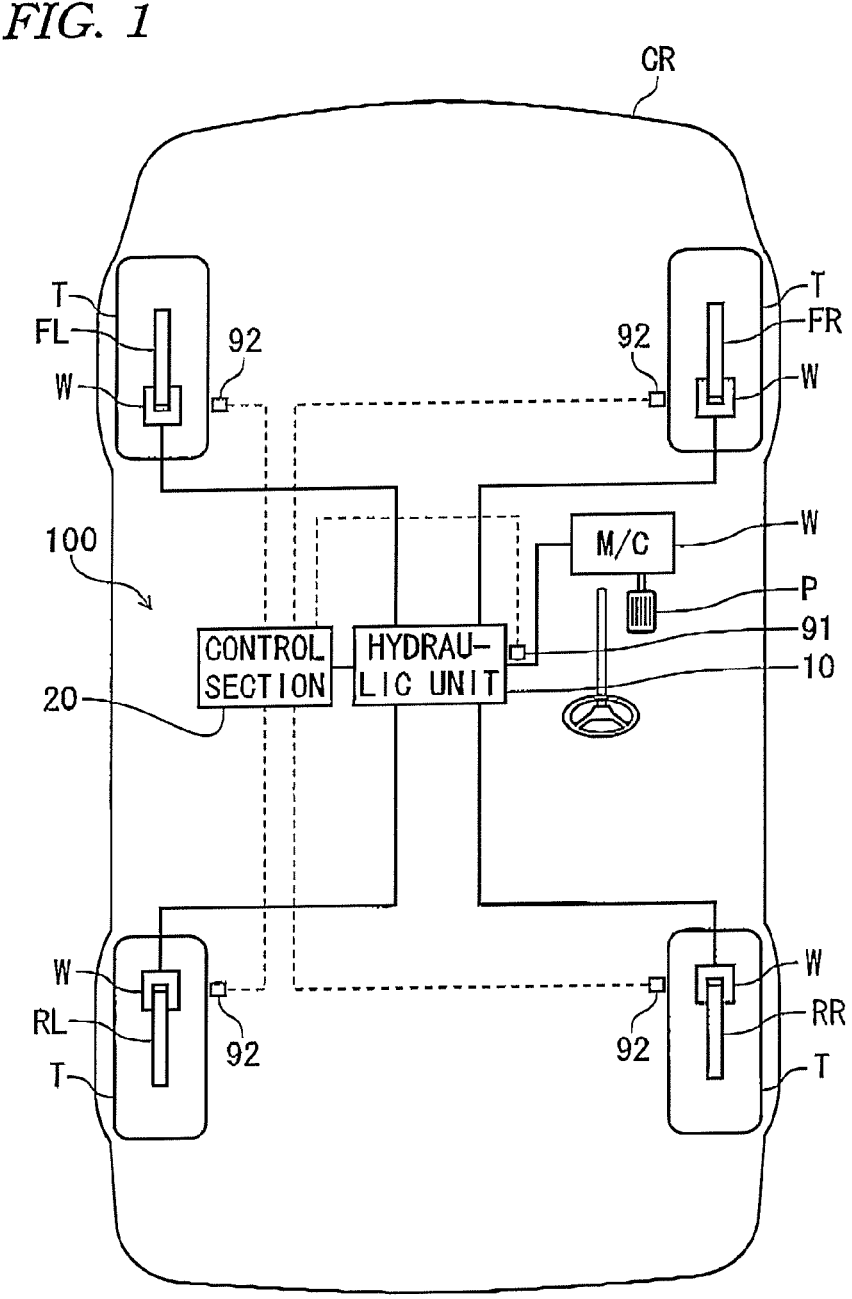
FIG. 1 shows a vehicle in which a vehicle brake fluid pressure controller according to embodiments is equipped.

As shown in FIG. 1, a vehicle brake fluid pressure controller 100 is an apparatus for appropriately controlling a braking force to be applied to each wheel T of a vehicle CR. The vehicle brake fluid pressure controller 100 is mainly equipped with a hydraulic unit 10 provided with hydraulic passages and various components and a control section 20 for appropriately controlling the various components inside the hydraulic unit 10. The control section 20 functions as a vehicle brake fluid pressure controller.

The wheels T are respectively equipped with wheel brakes FL, RR, RL and FR, and each of the wheel brakes FL, RR, RL and FR is equipped with a wheel cylinder W. The wheel cylinder W generates a braking force by virtue of the hydraulic pressure supplied from a master cylinder M serving as an example of a hydraulic pressure source. The master cylinder M and the wheel cylinders W are respectively connected to the hydraulic unit 10. Furthermore, the braking hydraulic pressure generated at the master cylinder M depending on the depressing force (the braking operation of the driver) of a brake pedal P is supplied to the wheel cylinders W under the control of the control section 20 and the hydraulic unit 10.

A pressure sensor 91 for detecting the hydraulic pressure inside the master cylinder M and a wheel velocity sensor 92 for detecting the wheel velocity WV of each wheel T are connected to the control section 20. Furthermore, the control section 20 is, for example, equipped with a CPU, a RAM, a ROM and input/output circuits, and performs control for increasing and decreasing the hydraulic pressure of the wheel brakes FL, RR, RL and FR by performing various kinds of arithmetic processing on the basis of the input from the pressure sensor 91 and the wheel velocity sensor 92 and on the basis of the programs and data stored in the ROM. The details of the control section 20 will be described later.

Figure 2:
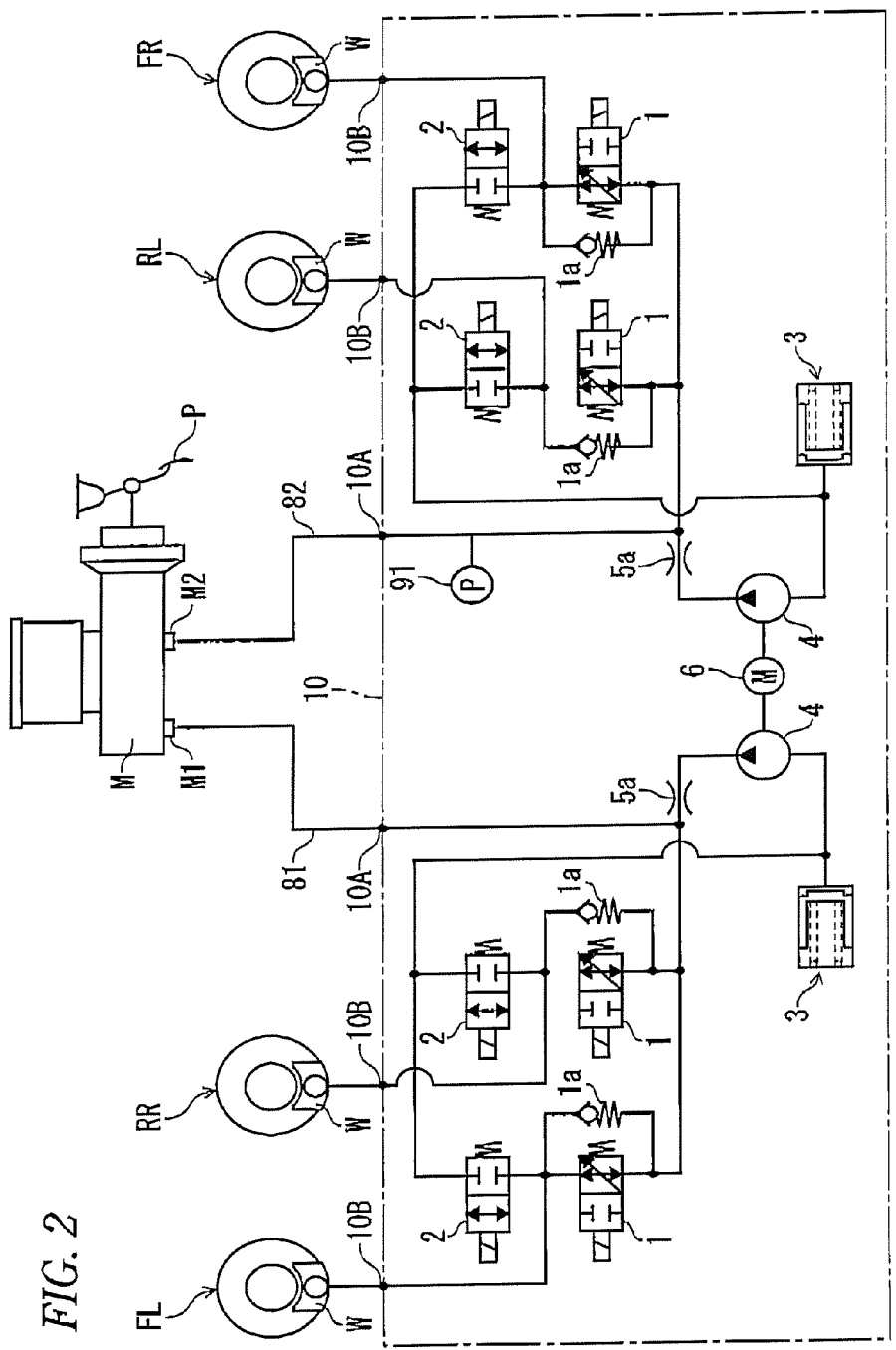
FIG. 2 shows a hydraulic unit.

As shown in FIG. 2, the hydraulic unit 10 is disposed between the master cylinder M and the wheel brakes FL, RR, RL and FR. The two output ports M1 and M2 of the master cylinder M are connected to the inlet ports WA of the hydraulic unit 10, and the outlet ports 10b thereof are respectively connected to the wheel brakes FL, RR, RL and FR. Furthermore, hydraulic passages are formed such that communication is usually established from the inlet ports 10A to the outlet ports 10B inside the hydraulic unit 10, whereby the depressing force of the brake pedal P is transmitted to each of the wheel brakes FL, RR, RL and FR.

The hydraulic unit 10 is provided with four inlet valves 1, four outlet valves 2 and four check valves 1a corresponding to the respective wheel brakes FL, RR, RL and FR. In addition, the hydraulic unit 10 is provided with two reservoirs 3, two pumps 4 and two orifices 5a corresponding to hydraulic passages 81 and 82 that correspond to the output ports M1 and M2, and the hydraulic unit 10 is further equipped with an electric motor 6 for driving the two pumps 4.

The inlet valve 1 is a normally-open proportional solenoid valve disposed in the hydraulic passage (on the upstream side of each of the wheel brakes FL, RR, RL and FR) extending from the master cylinder M to each of the wheel brakes FL, RR, RL and FR.

The inlet valve 1 is equipped with a spring for biasing the valve element thereof so as to be moved away from the valve seat thereof, a stationary core that is energized by applying electric power to a coil unit and a movable core that is moved by a magnetic force exerted from the energized stationary core so as to press the valve element against the biasing force of the spring; these components are not shown. Furthermore, the opening amount of the inlet valve 1 can be adjusted depending on the amount of electric power supplied from the control section 20 described above.

The inlet valve 1 is normally open, thereby allowing the brake fluid pressure to be transmitted from the master cylinder M to each of the wheel brakes FL, RR, RL and FR. In addition, the inlet valve 1 is closed by the control section 20 when the wheel T is likely to lock, thereby shutting off the hydraulic pressure from being transmitted from the brake pedal P to each of the wheel brakes FL, RR, RL and FR.

The valve element of the inlet valve 1 is energized toward the master cylinder M by the electromagnetic force corresponding to the current applied thereto, and this energizing force can adjust the hydraulic pressure of the wheel brakes FL, RR, RL and FR. More specifically, since the hydraulic pressure inside each of the wheel brakes FL, RR, RL and FR is increased at a predetermined inclination, the inlet valve 1 is controlled by the control section 20 so as to have a predetermined valve closing force.

The outlet valve 2 is a normally-closed solenoid valve disposed between each reservoir 3 and each of the wheel brakes FL, RR, RL and FR (on the hydraulic passage extending from the hydraulic passage of the inlet valve 1 on the side of the wheel cylinder W to the hydraulic passage leading to the reservoir 3, the pump 4 and the master cylinder M). Although the outlet valve 2 is normally closed, it is opened by the control section 20 when the wheel T is likely to lock, whereby the hydraulic pressure applied to each of the wheel brakes FL, RR, RL and FR is relieved to each reservoir 3.

The check valve 1a is connected in parallel with each inlet valve 1. The check valve 1a is a valve for allowing the brake fluid to flow only from each of the wheel brakes FL, RR, RL and FR to the master cylinder M. In the case that the input from the brake pedal P is released and when the inlet valve 1 is closed, the check valve 1a also allows the brake fluid to flow from each of the wheel brakes FL, RR, RL and FR to the master cylinder M.

The reservoir 3 is provided to temporarily absorb the brake fluid that is relieved when each output valve 2 is opened.

The pump 4 can suck the brake fluid absorbed in the reservoir 3 and return the brake fluid to the master cylinder M via the orifice 5a. Hence, the pressure state of each of the output hydraulic passages 81 and 82, lowered by the absorption of the brake fluid by the reservoir 3, is recovered.

The open/close states of the inlet valve 1 and the output valve 2 are controlled by the control section 20, whereby the hydraulic pressure (hereafter also referred to as "caliper pressure") to be transmitted to the wheel cylinder W of each of the wheel brakes FL, RR, RL and FR is controlled. For example, in the normal state in which the inlet valve 1 is open and the output valve 2 is closed, when the brake pedal P is depressed, the hydraulic pressure is directly transmitted from the master cylinder M to the wheel cylinder W, whereby a pressure increase state occurs. When the inlet valve 1 is closed and the output valve 2 is open, the brake fluid flows from the wheel cylinder W to the reservoir 3, whereby a pressure decrease state occurs. When both the inlet valve 1 and the output valve 2 are closed, a holding state occurs in which the caliper pressure is held.

When the hydraulic pressure of the master cylinder M is rising, in the case that an appropriate amount of current not causing the inlet valve 1 to be fully closed is passed while the output valve 2 is closed, the inflow of the brake fluid from the master cylinder M to the wheel cylinder W is limited depending on the amount of the current, and the hydraulic pressure of the wheel cylinder W can be raised gradually. In a state in which the current is applied to the inlet valve 1 and a predetermined valve closing force is generated, a pressure increase state occurs in which the caliper pressure increases gradually at a predetermined inclination. Then, the control section 20 outputs a predetermined amount of current or a control signal to each inlet valve 1 or each output valve 2 to perform switching among the pressure increase state, the pressure decrease state and the holding state described above depending on the target brake fluid pressure of each wheel cylinder W.

Figure 3:
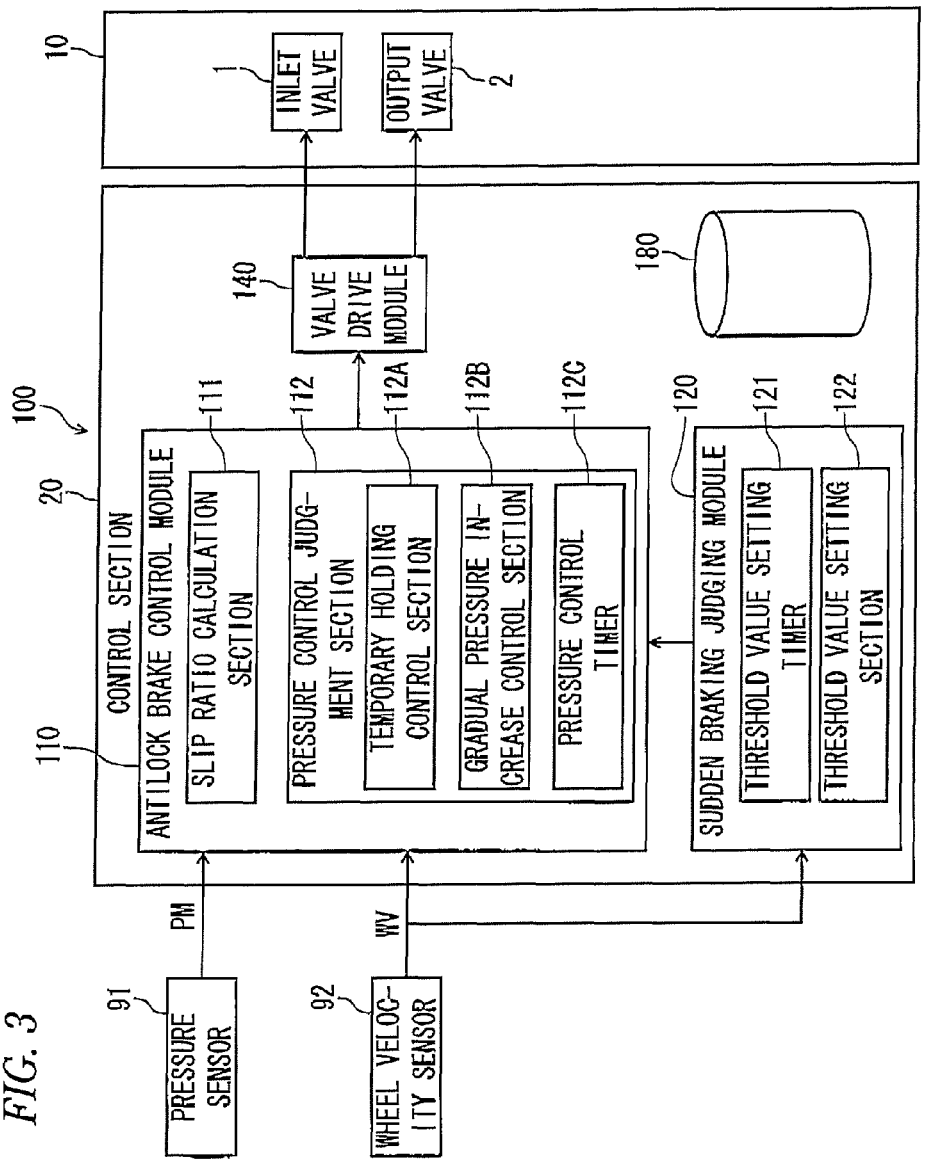
FIG. 3 shows a control section according to a first embodiment.

Next, the details of the control section 20 will be described. As shown in FIG. 3, to the control section 20, master cylinder pressure PM is input from the pressure sensor 91 and wheel velocity WV is input from the wheel velocity sensor 92, and the control section 20 controls the inlet valve 1 and the output valve 2 at least on the basis of the wheel velocity WV. The control section 20 has an antilock brake control module 110, a sudden braking judging module 120, a valve drive module 140 and a storage module 180.

The antilock brake control module 110 has a slip ratio calculation section 111 and a pressure control judgment section 112.

The slip ratio calculation section 111 calculates the slip ratio SL of each wheel T using a known calculation method on the basis of the output from the wheel velocity sensor 92, and outputs the slip ratio to the pressure control judgment section 112. The slip ratio SL can be obtained, for example, by dividing the difference (slip amount) between the vehicle speed estimated from the wheel velocity WV and the wheel velocity WV by the wheel velocity WV.

The pressure control judgment section 112 judges whether the brake fluid pressure (caliper pressure) of each wheel T should be set to the pressure decrease state, the pressure increase state or the holding state on the basis of the wheel acceleration WA estimated from the wheel velocity WV and the slip ratio SL as in the case of the known ABS controller, and outputs the state to the valve drive module 140. More specifically, in the case that the slip ratio SL becomes larger than a predetermined threshold value SLth and that the wheel acceleration WA is equal to or less than 0 (the wheel deceleration is equal to or more than 0), the pressure control judgment section 112 judges that the wheel T is likely to lock and determines that the caliper pressure should be set to the pressure decrease state. Furthermore, in the case that the wheel acceleration WA is more than 0, the judgment section determines that the caliper pressure should be set to the holding state. In the case that the slip ratio SL becomes equal to or less than the predetermined threshold value and that the wheel acceleration WA is equal to or less than 0, the judgment section determines that the caliper pressure should be set to the pressure increase state. In this embodiment, the wheel acceleration and the wheel deceleration are defined by one parameter (wheel acceleration WA). When the wheel acceleration is negative, this can be regarded that the wheel is decelerating.

In this embodiment, the pressure control judgment section 112 has a temporary holding control section 112A, a gradual pressure increase control section 112B and a pressure control timer 112O to stabilize the operation at the time of sudden braking, in addition to performing ordinary ABS control.

The temporary holding control section 112A performs holding control for a first predetermined time (a time corresponding to a threshold value TM2th1 described later) by fully closing the inlet valve 1 corresponding to each of the front wheel brakes FR and FL when the pressure is increasing due to sudden braking in the case that the sudden braking judging module 120 judges that sudden braking is performed. This temporary holding control is performed to securely stop the flow of the brake fluid flowing from the master cylinder M to each of the front wheel brakes FR and FL at the time of sudden braking thereby to securely perform the subsequent gradual pressure increase control. Hence, the current to be applied to the inlet valve 1 should only be sufficient to close the inlet valve 1. In a simple case, the current should only be applied at a duty ratio of 100%. However, the duty ratio is not necessarily limited to 100%, provided that the inlet valve 1 can be closed. Furthermore, it is assumed that the first predetermined time in which the inlet valve 1 is closed is sufficient, provided that the inlet valve 1 can be closed once. For this reason, the first predetermined time should be a time equal to or more than the response time of the inlet valve 1 and should be as short as possible, thereby being set appropriately depending on the type of the inlet valve 1 to be used. In this embodiment, the temporary holding control section 112A determines the predetermined time depending on whether the count value TM2 of the pressure control timer 112C exceeds the threshold value TM2th1.

The gradual pressure increase control section 112B increases the pressure at a predetermined inclination by controlling the current to be applied to the inlet valve 1 immediately after temporal holding control is performed by the temporary holding control section 112A. This gradual pressure increase is performed until pressure decrease conditions (WA≤0 and SL>S1th) in the basic ABS control of the pressure control judgment section 112 described above are satisfied. The predetermined inclination is obtained by slightly closing the inlet valve 1 and by limiting the amount of the brake fluid entering from the master cylinder M and is thus smaller than that in the case that the inlet valve 1 is opened (no current is applied). The current to be applied to the inlet valve 1 to perform the gradual pressure increase may have a constant value or the current may be changed so that the pressure of each of the wheel brakes FR and FL rises at a predetermined inclination while the pressure of the master cylinder M is compared with the pressure of each of the wheel brakes FR and FL. In the former case in which the current to be applied to the inlet valve 1 has the constant value, the predetermined inclination is not always constant. In the latter case in which the current is changed, the inclination becomes constant (as intended).

Figure 8:
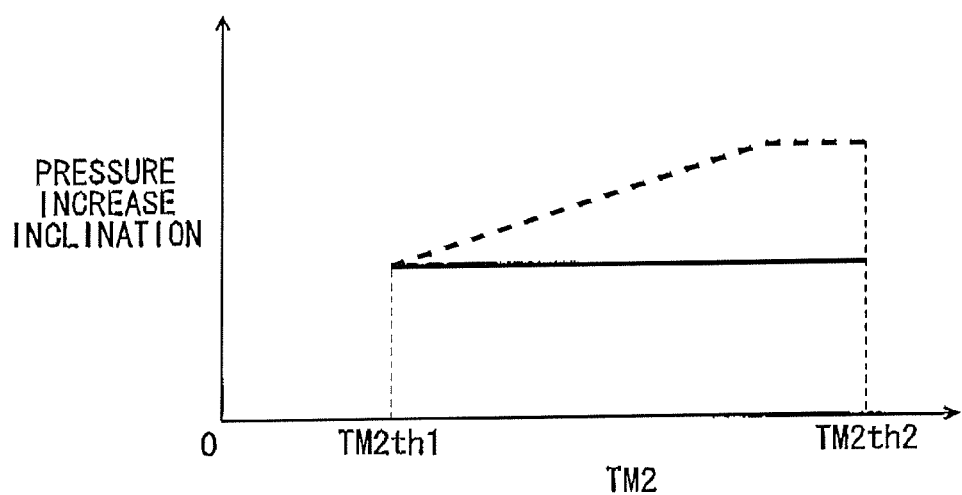
FIG. 8 shows an exemplary table indicating the relationship between the count value TM2 of a pressure control timer and a pressure increase inclination.

Moreover, as a further preferable mode, the gradual pressure increase control section 112B can set the pressure increase inclination so that the inclination becomes larger gradually (to a steep inclination) depending on the count value TM2 of the pressure control timer 112C. For example, as shown in FIG. 8, the pressure increase inclination may be a constant value as indicated by the solid line in the figure or may gradually increase as the TM2 increases as indicated by the broken line in the figure. In the case that the pressure increase inclination is gradually increased, the inclination may be set to a constant value (upper limit value) after a certain time has passed as indicated by the broken line in FIG. 8.

The gradual pressure increase control section 112B stops the gradual pressure increase and fully opens the inlet valve 1 in the case that the count value TM2 of the pressure control timer 112C exceeds a predetermined value TM2th2, that is, in the case that pressure decrease control is not performed even after a second predetermined time (the time corresponding to TM2th2-TM2th1) has passed after the gradual pressure increase control is started. Hence, even if an abnormal situation occurs, for example, a mistake is made in the judgment of sudden braking, the control can be returned to the ordinary ABS control.

The pressure control timer 112C is a timer for counting the time elapsed after the sudden braking judging module 120 judged that sudden braking is performed. The time of the temporal holding control and the time of the gradual pressure increase can be monitored according to the count value TM2 of the pressure control timer 112C.

In this embodiment, the temporal holding control and the gradual pressure increase control described above are performed only for the front wheels. The reason for this is that when sudden braking is performed, the load to the front wheels increases but the load to the rear wheels decreases, whereby the bralcing control for the front wheels significantly affects the stability of the vehicle in the early stage of the braking.

On the basis of the amount of the change in the wheel velocity WV, the sudden braking judging module 120 judges whether sudden braking is performed. More specifically, the sudden braking judging module 120 judges whether sudden braking is performed depending on whether the absolute value of wheel acceleration |WA| (that is, the absolute value of the wheel deceleration) exceeds a sudden braking judgment threshold value WAth2. For this purpose, the sudden braking judging module 120 is equipped with a threshold value setting timer 121 and a threshold value setting section 122.

The threshold value setting timer 121 counts the time elapsed after the absolute value of wheel acceleration |WA| (that is, the absolute value of the wheel deceleration) becomes equal to or more than a predetermined value WAth1. During deceleration, the wheel acceleration decreases while fluctuating up and down. Hence, in order that only the pure deceleration state is reflected on the sudden braking judgment threshold value WAth2, the threshold value setting timer 121 counts the count value TM1 only when the wheel acceleration is decreasing (when the absolute value of the wheel deceleration is increasing).

Figure 7:
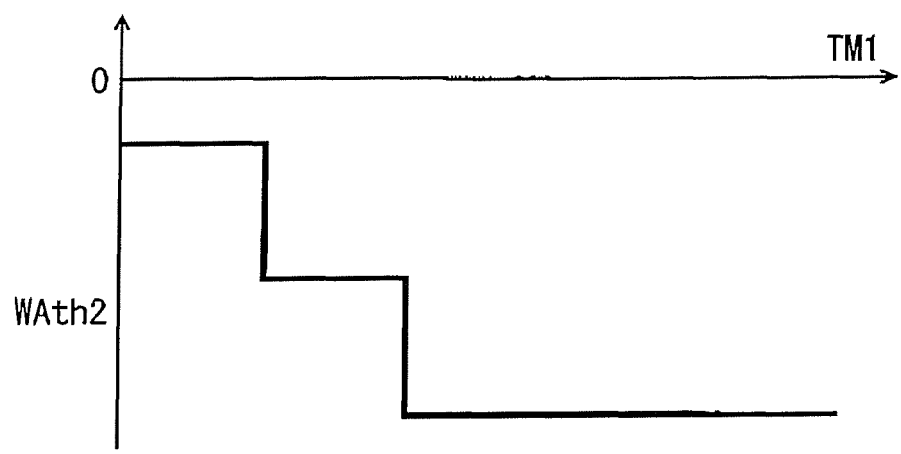
FIG. 7 shows an exemplary table indicating the relationship between the count value TM1 of a threshold value setting timer and a sudden braking judgment threshold value WAth2.

The threshold value setting section 122 sets the sudden braking judgment threshold value WAth2. More specifically, the threshold value setting section 122 refers to the table in FIG. 7 and sets the sudden braking judgment threshold value WAth2 depending on the count value TM1 of the threshold value setting timer 121. As shown in FIG. 7, in the table for determining the sudden braking judgment threshold value WAth2, the threshold value WAth2 becomes smaller stepwise as TM1 increases (the absolute value thereof becomes larger because the wheel T decelerates in the case that the wheel acceleration WA is negative). Hence, the sudden braking judgment threshold value WAth2 is changed to the side in which the absolute value of the deceleration is larger depending on the time (the count value TM1) elapsed from the time when the absolute value of the wheel deceleration becomes equal to or more than the predetermined value WAth1.

The valve drive module 140 outputs a control signal to the inlet valve 1 and the outlet valve 2 according to an instruction regarding pressure decrease, pressure increase, gradual pressure increase or holding having been output from the pressure control judgment section 112. More specifically, as described above, the inlet valve 1 is closed and the output valve 2 is opened to obtain the pressure decrease state; the inlet valve 1 is opened and the output valve 2 is closed to obtain the pressure increase state; appropriate current is applied to the inlet valve 1 to limit the flow of brake fluid from the master cylinder M to each of the front wheel brakes FR and FL and the output valve 2 is closed to obtain the gradual pressure increase state; and both the inlet valve 1 and the output valve 2 are closed to obtain the holding state.

The storage module 180 stores various threshold values, tables, etc. for the above-mentioned respective control operations.

The processing of the pressure decrease control using the vehicle brake fluid pressure controller 100 configured as described above will be described below referring to FIGS. 4 to 6.

Figure 4:
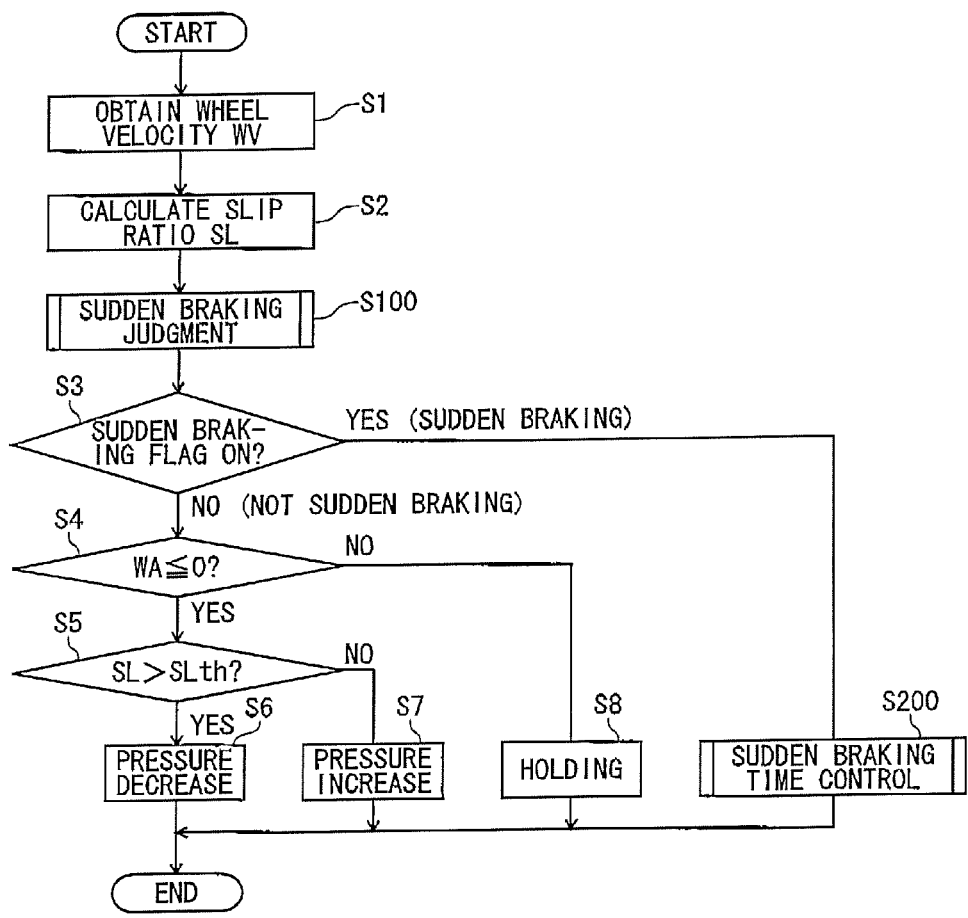
FIG. 4 shows the processing of ABS control.

First, the overall processing of the ABS control will be described referring to FIG. 4. During the braking of the vehicle CR, the antilock brake control module 110 obtains the wheel velocity WV from the wheel velocity sensor 92 (at S1) and calculates the slip ratio SL from the wheel velocity WV (at S2). Then, the sudden bralcing judging module 120 judges whether sudden braking is performed (at S100). A sudden braking flag is turned ON in the case that it is judged that sudden braking is performed, and turned OFF in the case that it is judged that sudden braking is not performed, although the details of the processing of the sudden braking judgment will be described later. Then, at step S3, the sudden braking judging module 120 judges whether the sudden braking flag is ON. In the case that it is judged that sudden braking is performed and that the sudden braking flag is ON (Yes at S3), sudden braking time control (at S200) is performed. On the other hand, in the case that the sudden braking flag is OFF (NO at S3), a judgment is made as to whether the wheel acceleration WA is equal or less than 0. In the case that the wheel acceleration WA is not equal to or less than 0 (No at S4), the inlet valve 1 is fully closed and holding control is performed (at S8). In the case that the wheel acceleration WA is equal to or less than 0 (Yes at S4), a judgment is made as to whether the slip ratio SL is larger than the threshold value SLth; in the case that the slip ratio SL is larger (Yes at S5), the output valve 2 is opened and pressure decrease control is performed (at S6), and in the case that the slip ratio SL is not larger (No at S5), the inlet valve 1 is fully opened and pressure increase control is performed (at S7).

Figure 5:
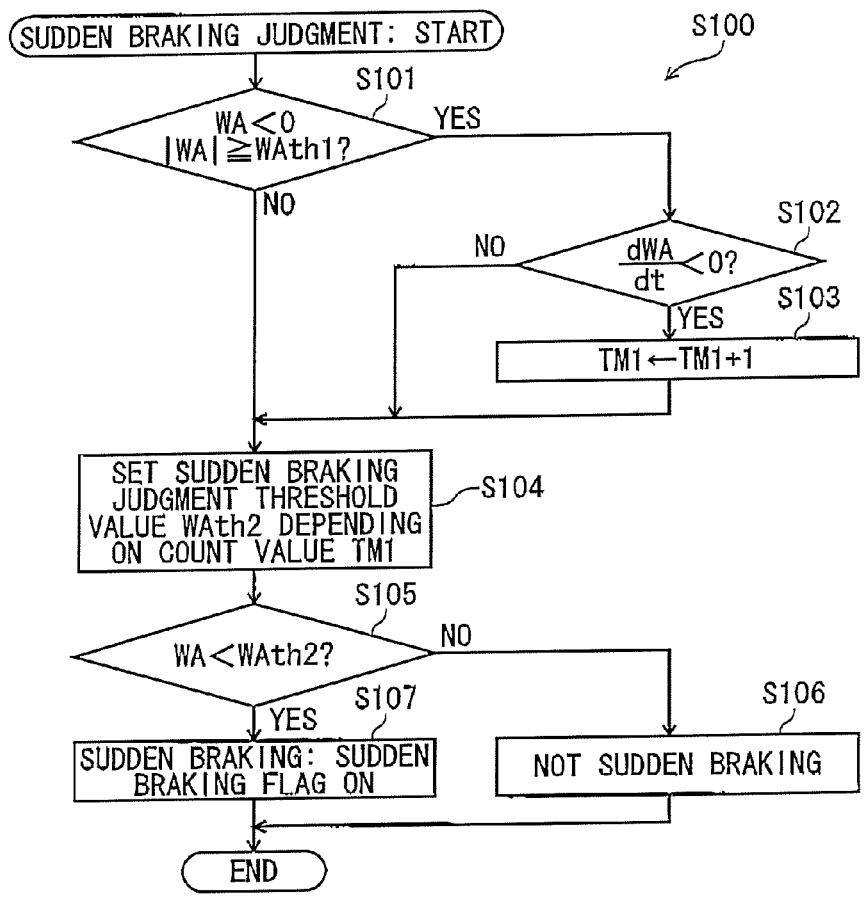
FIG. 5 shows the processing of sudden braking judgment.

The sudden braking judgment processing in the above-mentioned ABS control will be described below. As shown in FIG. 5, first, the threshold value setting timer 121 judges whether the absolute value of the wheel acceleration |WA| (the absolute value of the wheel deceleration) is equal to or more than the predetermined value WAth1 to determine whether the count value TM1 should be incremented. Since the wheel acceleration WA is herein used as a variable, a judgment is made as to whether WA is negative and another judgment is made as to whether the absolute value of WA is equal to or more than WAth1 (at S101). In the case that these two conditions are satisfied (Yes at S101), a further judgment is made as to whether dWA/dt is negative (at S102) to determine whether the wheel acceleration WA is decreasing; in the case that dWA/dt is negative (Yes at S102), the count value TM1 is incremented (at S103), and the processing advances to step S104. In the case that dWA/dt is not negative (No at S102) and that the conditions at step S101 are not satisfied, the processing advances to step S104 without incrementing the count value TM1. Then, the threshold value setting section 122 sets the sudden braking judgment threshold value WAth2 depending on the count value TM1 and according to the table shown in FIG. 7 (at S104). Then, the sudden braking judging module 120 judges whether the wheel acceleration WA is smaller than the sudden braking judgment threshold value WAth2 (whether the wheel deceleration is more than the threshold value). In the case that the wheel acceleration WA is smaller than the sudden braking judgment threshold value WAth2 (YES at step S105), the judging module 120 judges that sudden braking is performed and turns ON the sudden bralcing flag (at S107). On the other hand, in the case that the wheel acceleration WA is not smaller than the sudden braking judgment threshold value WAth2 (No at step S105), the judging module 120 judges that sudden braking is not performed (at S106).

Next, the sudden braking time control processing at step S200 will be described below.

Figure 6:
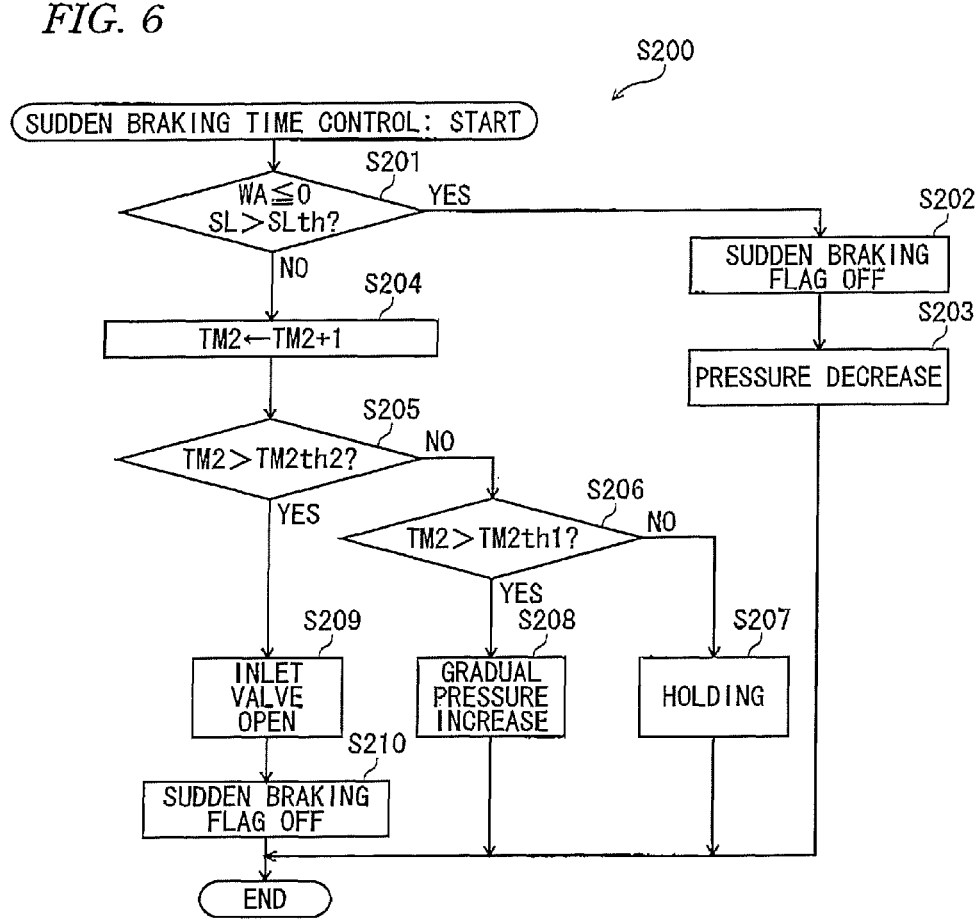
FIG. 6 shows the processing of sudden braking time control of ABS control.

As shown in FIG. 6, at step S201, the pressure control judgment section 112 judges whether the pressure decrease conditions are satisfied (at S201) as a condition judgment for getting out of the sudden braking control. This judgment is the same as the pressure decrease judgment in the ordinary ABS control and corresponds to step S4 and step S5 shown in FIG. 4. More specifically, the judgment section judges whether the wheel acceleration WA is equal to or less than 0 and whether the slip ratio SL is more than the threshold value SLth. In the case that it is judged that the pressure decrease conditions are satisfied (YES at step S201), the sudden braking flag is turned OFF because the purpose of the sudden braking control has been accomplished, pressure decrease is instructed, the output valve 2 is opened by the valve drive module 140 to perform pressure decrease control (at S203).

In the case that the pressure decrease conditions are not satisfied at step S201 (NO at S201), the pressure control timer 112C increments the count value TM2 as the time in which the sudden braking time control is performed (at S204). Then, the gradual pressure increase control section 112B judges whether the count value TM2 is larger than the predetermined value TM2th2. At the beginning of the sudden braking time control, the count value TM2 is small and is not more than the predetermined value TM2th2 (No at S205), and the processing advances to step S206. The pressure control judgment section 112 judges whether the count value TM2 is larger than the threshold value TM2th2 at step S206. At the beginning of the sudden braking time control, the count value TM2 is small and is not more than the threshold value TM2th1 (NO at S206), and the holding control is performed by the temporary holding control section 112A (at S207). More specifically, holding is instructed to the valve drive module 140 and the inlet valve 1 is fully closed.

When the time for TM2th1 has passed after the entry into the sudden braking time control, it is judged that the count value TM2 is larger than the TM2th1 at step S206, and gradual pressure increase control is performed by the gradual pressure increase control section 112B (at S208). More specifically, the flow of the brake fluid from the master cylinder M to each of the front wheel brakes FR and FL is restricted, for example, by applying a predetermined current not causing the inlet valve 1 to be fully opened, whereby the brake fluid pressure of each of the front wheel brakes FR and FL rises gradually in comparison with the case in which the gradual pressure increase control is not performed. Then, when the brake fluid pressure of each of the front wheel brakes FR and FL rises and when the slip ratio SL becomes large, it is judged that the pressure decrease conditions have been satisfied at step S201 described above, the sudden braking flag is turned OFF (at S202), and the processing enters into the ordinary pressure decrease control (at S203).

After the processing entered into the sudden braking time control, the gradual pressure increase at step S208 continues. In the case that the pressure decrease conditions are not satisfied, at the time when the count value TM2 becomes larger than the TM2th2 (Yes at S205), the gradual pressure increase control section 112B stops applying the current to the inlet valve 1 to open the inlet valve 1 (at S209) and turns OFF the sudden braking flag (at S210), thereby ending the sudden braking time control.

An example of the behavior of the vehicle CR being subjected to the above-mentioned processing will be described below referring to FIG. 9. FIGS. 9(a), 9(b), 9(c), 9(d) and 9(e) indicate the changes of the count value TM2, the caliper pressure, the pressure control state, the wheel acceleration WA and the count value TMX, respectively. The time axes of FIGS. 9(d) and 9(e) are magnified as compared with those of FIGS. 9(a), 9(b) and 9(c) (refer to the position of t3).

When sudden braking is performed, the caliper pressure increases suddenly as shown in FIG. 9(b). Then, the vehicle CR decelerates suddenly, and the wheel acceleration WA (negative value) decreases (the absolute value of the wheel deceleration increases). When the wheel acceleration WA becomes equal to or less than the predetermined value WAth1 (at t1), the count value TM1 is counted (between t1 to t5) as shown in FIG. 9(e), and the sudden braking judgment threshold value WAth2 is set depending on the count value TM1 (refer to t1, t2, t4 and FIG. 9(d)). Then, when the wheel acceleration WA becomes lower than the sudden braking judgment threshold value WAth2 at time t3, it is judged that sudden braking is performed, and the temporal holding control is performed (refer to t3 to t6 in FIGS. 9(b) and 9(c)).

After the temporal holding control, when the time only for the threshold value TM2th1 has passed after the judgment of sudden braking (see t6 and FIG. 9(a)), the gradual pressure increase control is performed (refer to t6 to t7 in FIGS. 9(b) and 9(c)). Then, when the pressure decrease conditions are satisfied, pressure decrease is performed (refer to t7 to t8 in FIGS. 9(b) and 9(c)). Then, as in the case of the ordinary ABS control, the holding control (refer to t8 to t9 in FIGS. 9(b) and 9(c)), the pressure increase control (refer to t9 to t10 in FIGS. 9(b) and 9(c)) and braking pressure control are performed continuously depending on the wheel acceleration WA and the slip ratio SL. Although the pressure increase control is performed in two steps between time t9 to t10, the pressure increase control may be performed in one step.

In the case that the pressure increase inclination is made larger as the count value TM2 is increased, the pressure increase inclination gradually becomes steeper in the gradual pressure decrease control as indicated by the broken line in FIG. 9(b). Hence, the processing can easily enter into the pressure decrease control even if the brake fluid pressure of the front wheel brake is low when the processing entered into the temporal holding control.

In the case that the temporal holding control and the gradual pressure increase control according to this embodiment are not performed, the brake fluid pressure rises excessively and excessive slip occurs as indicated by the alternate long and short dashes line in FIG. 9(b). In the subsequent pressure decrease, unless the pressure is decreased excessively, the slip is not eliminated. As a result, the caliper pressure fluctuates significantly. Qn the other hand, in the case that the temporal holding control and the gradual pressure decrease control are performed as in the case of this embodiment, the brake fluid pressure is suppressed from rising excessively as indicated by the solid line in FIG. 9(b). In the subsequent pressure decrease, the slip is also eliminated by minimal pressure decrease. In this way, in the vehicle brake fluid pressure controller 100 according to this embodiment, the fluctuations of the brake fluid pressure at the start time of the ABS control can be made small, and the ABS control and the behavior of the vehicle CR can be stabilized. Then, in the vehicle brake fluid pressure controller 100 according to this embodiment, in the case that the pressure decrease control conditions are not satisfied even after the second predetermined time has passed after the gradual pressure increase control is started, the pressure is increased by fully opening the inlet valve 1. Hence, even if a mistake is made in the judgment of sudden braking, the ordinary braking force can be generated.

Furthermore, in the vehicle brake fluid pressure controller 100 according to this embodiment, a judgment is made as to whether sudden braking is performed on the basis of the change amount (wheel acceleration WA) of the wheel velocity WV. For this reason, a judgment as to whether sudden braking is performed can be made without using a sensor or the like for detecting the depressing amount of the pedal.

Moreover, since the sudden braking judgment threshold value WAth2 is changed to the side in which the absolute value of the deceleration is large depending on the time elapsed from the time in which the absolute value of the wheel deceleration becomes equal to or more than the predetermined value WAth1, the sudden braking judging module 120 can accurately judge whether sudden braking is performed.

While the first embodiment has been described above, it can be variously modified without departing from the scope of the invention.

For example, although the sudden braking judgment threshold value WAth2 is decreased stepwise (the absolute value thereof is increased) in the above-mentioned embodiment, the threshold value may be decreased gradually (continuously).

Still further, although the temporal holding control and the gradual pressure decrease control are performed only for the front wheels in the above-mentioned embodiment, the temporal holding control and the gradual pressure decrease control may also be performed for the rear wheels in the same way.

Although the vehicle brake fluid pressure controller for performing only the ABS control has been exemplified in the above-mentioned embodiment for the sake of simplicity, the control may be combined with other control techniques, such as vehicle attitude control and brake assisting control, by appropriately adding control valves.

Furthermore, a known method other than the method according to the above-mentioned embodiment can also be used for the sudden braking judgment.

(Second Embodiment)

Next, a second embodiment will be described below.

As in the case of the first embodiment, the second embodiment provides such a vehicle brake fluid pressure controller 100 as shown in FIG. 1. The hydraulic unit 10 thereof is similar to that according to the first embodiment and has such a structure as shown in FIG. 2. However, the control section 20 thereof is different from that according to the first embodiment and has the structure shown in FIG. 10. The control section 20 will be described below in detail.

Figure 10:
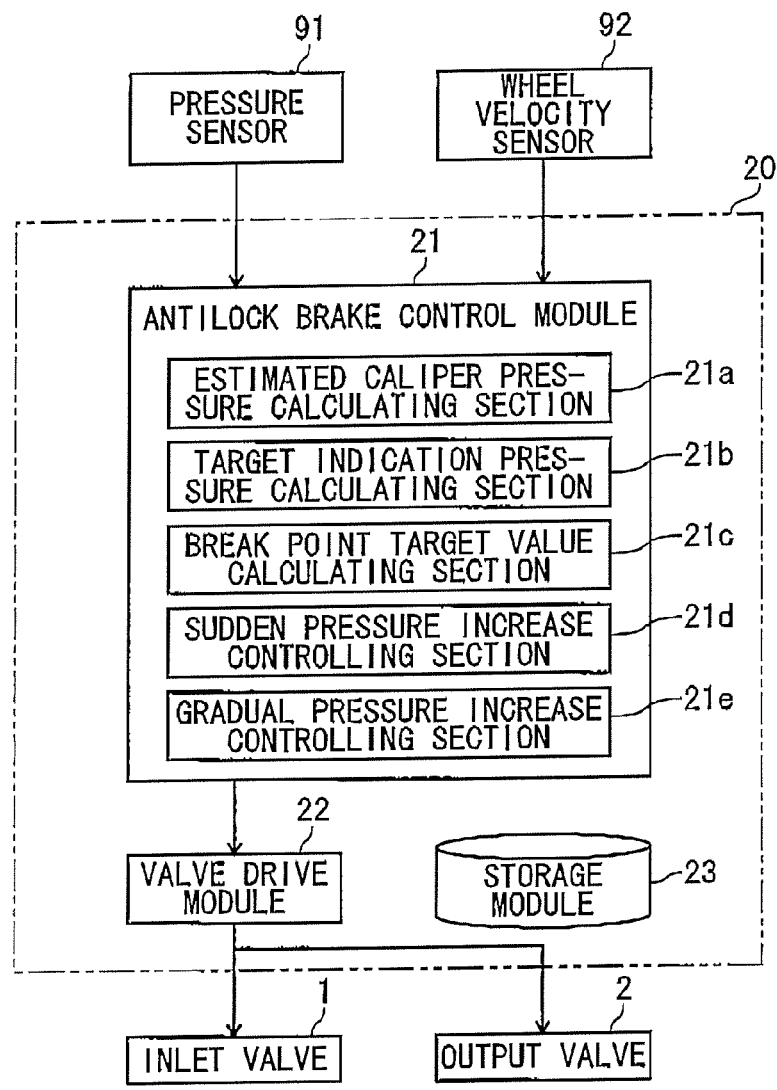
FIG. 10 shows a control section according to a second embodiment.

As shown in FIG. 10, the control section 20 is equipped with an antilock brake control module 21, a valve drive module 22 and a storage module 23.

The antilock brake control module 21 appropriately and selectively performs the pressure decrease control for decreasing the caliper pressure, the holding control for holding the caliper pressure and the pressure increase control for increasing the caliper pressure depending on the state of the vehicle CR. More specifically, for example, the antilock brake control module 21 judges that the wheel T is likely to lock when the slip ratio described in the first embodiment becomes equal to or more than the predetermined value and when the wheel acceleration is equal to or less than 0, and then performs the pressure decrease control. The wheel acceleration is calculated from the wheel velocity, for example.

Furthermore, when the wheel acceleration is more than 0, the antilock brake control module 21 performs the holding control. Moreover, when the slip ratio is less than the predetermined value and when the wheel acceleration is equal to or less than 0, the antilock brake control module 21 performs the pressure increase control.

In addition, the antilock brake control module 21 performs sudden pressure increase control for raising the caliper pressure at a relatively steep first inclination and gradual pressure increase control for raising the caliper pressure at a second inclination and a third inclination being gentler than the first inclination in the pressure increase control. More specifically, the antilock brake control module 21 has an estimated caliper pressure calculating section 21a, a target indication pressure calculating section 21b, a break point target value calculating section 21c, a sudden pressure increase controlling section 21d and a gradual pressure increase controlling section 21e.

The estimated caliper pressure calculating section 21a calculates estimated caliper pressure on the basis of the master cylinder pressure detected by the pressure sensor 91 and the control history of the inlet valve 1 and the output valve 2 controlled by the antilock brake control module 21.

Figure 11:
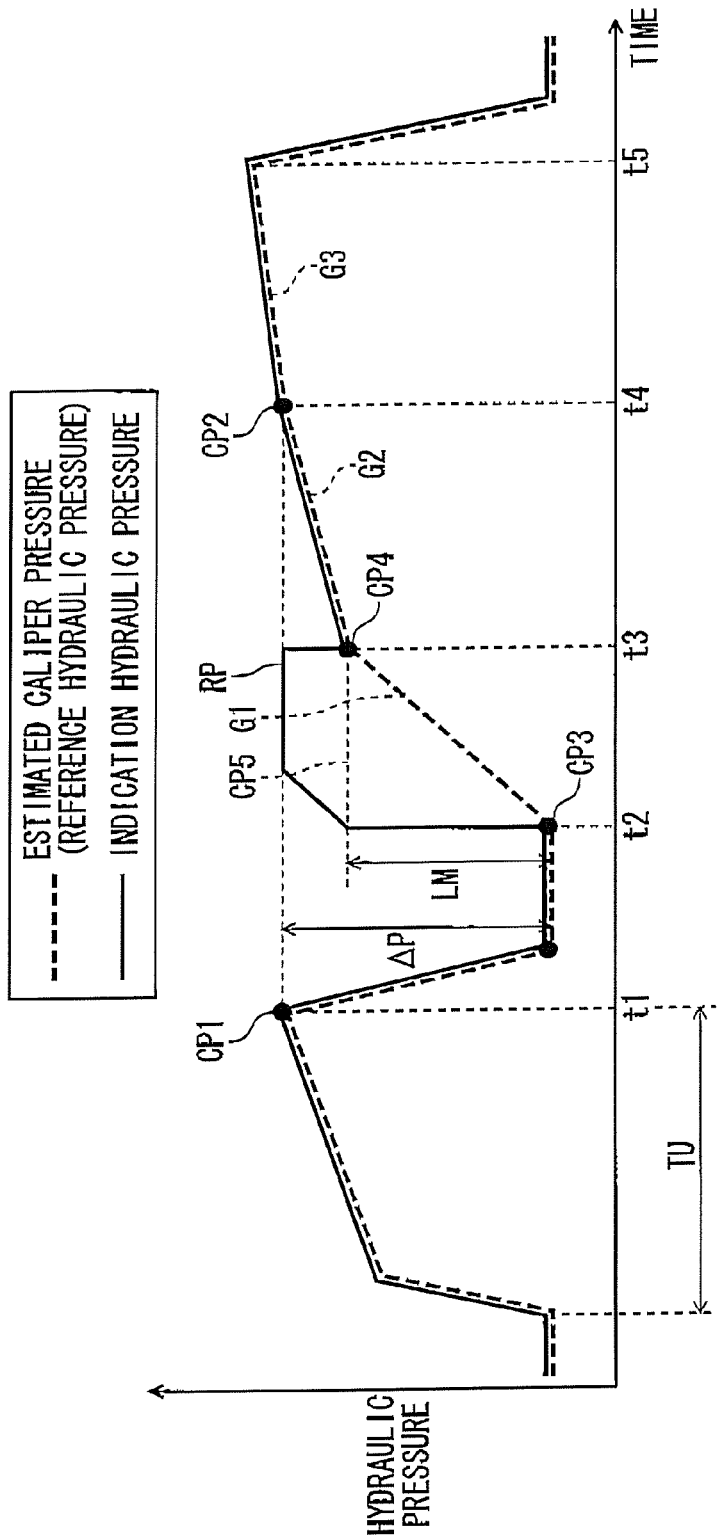
FIG. 11 shows a method for setting indication hydraulic pressure.

The target indication pressure calculating section 21b calculates target indication pressure on the basis of the hydraulic pressure at the start time of the pressure decrease of the last time. More specifically, in this embodiment, as shown in FIG. 11, the target indication pressure calculating section 21h sets the estimated caliper pressure CP1 at the start time (at time t1) of the pressure decrease of the last time as a target indication pressure CP2. Since the antilock brake control starts from the pressure decrease control, the target indication pressure is set securely even when the pressure increase control of the first time is started.

The break point target value calculating section 21 calculates a break point target value CP4 (hydraulic pressure at which it is expected that the pressure increase state does not end) on the basis of the estimated caliper pressure CP3 at the start time of the pressure increase and the target indication pressure CP2 shown in FIG. 11. More specifically, the break point target value calculating section 21c calculates the break point target value CP4 by multiplying the value ΔP (CP1-CP3), obtained by subtracting the estimated caliper pressure CP3 at the start time of the pressure increase from the target indication pressure CP2 (the estimated caliper pressure CP1 at the start time of the pressure decrease of the last time), by a predetermined ratio (sudden pressure increase ratio) RA and then by adding the value calculated by the multiplication to the estimated caliper pressure CP3 at the start time of the pressure increase.

The sudden pressure increase controlling section 21d sets reference hydraulic pressure for performing the sudden pressure increase control (between time t2 to 13) for raising the estimated caliper pressure from the estimated caliper pressure CP3 at the start time of the pressure increase to the break point target value CP4 at the first inclination G1. Although the reference hydraulic pressure is herein the target value (future value) of the caliper pressure obtained by calculation, the estimated caliper pressure is the estimated value of the present caliper pressure obtained by calculation. Hence, the reference hydraulic pressure is nearly equal to the estimated caliper pressure.

The first inclination G1 and a second inclination G2 and a third inclination G3 described later may be predetermined fixed values or may be obtained appropriately by calculation. As a calculation method, a method for calculating an inclination is given as an example in which the difference between the hydraulic pressure at the start time and that at the end time of the sudden pressure increase control (or first gradual pressure increase control and second gradual pressure increase control described later) is divided by a predetermined specified time.

Furthermore, the sudden pressure increase controlling section 21d changes the indication hydraulic pressure for controlling the inlet valve 1 from the reference hydraulic pressure to locking-equivalent hydraulic pressure RP corresponding to the estimated caliper pressure CP1 at the start time of the pressure decrease of the last time in the sudden pressure increase control. More specifically, according to this embodiment, in the sudden pressure increase control, the sudden pressure increase controlling section 21d is configured so that the reference hydraulic pressure or the locking-equivalent hydraulic pressure RP, whichever larger, is set as the indication hydraulic pressure.

Moreover, at the pressure increase start time of the pressure increase control, in the case that the locking-equivalent hydraulic pressure RP is selected as the indication hydraulic pressure, the caliper pressure can be increased more quickly in the sudden pressure increase control.

What's more, in the case that the difference between the reference hydraulic pressure (the hydraulic pressure at the pressure increase start time) and the locking-equivalent hydraulic pressure RP is equal to or more than a predetermined limit value LM1 at the pressure increase start time of the sudden pressure increase control, the sudden pressure increase controlling section 21d limits the indication hydraulic pressure to the value obtained by adding the limit value LM to the reference hydraulic pressure. Hence, the indication hydraulic pressure can be limited by using the limit value LM so as to be prevented from becoming too high. For this reason, in the case that excessive pressure increase is likely to occur, the amount of pressure increase can be limited to an appropriate amount.

Still further, in the case that the pressure increase time TU (the time required for the pressure increase control in the series of the pressure decrease control, holding control and pressure decrease control) of the last time is shorter than a predetermined time or in the case that the pressure decrease amount ΔP (CP1-CP3) in the pressure decrease control of the last time is more than a predetermined value, the sudden pressure increase controlling section 21d sets the locking-equivalent hydraulic pressure RP to a value smaller than the hydraulic pressure CP1 at the start time of the pressure decrease of the last time (for example, to a value CP5 obtained by subtracting the product of the sudden pressure increase ratio RA and the pressure decrease amount ΔP from the hydraulic pressure CP1). Hence, in the case that the pressure increase time TU of the last time is shorter than the predetermined time or in the case that the pressure decrease amount ΔP in the pressure decrease control of the last time is larger than the predetermined value, the locking-equivalent hydraulic pressure RP is made smaller. Hence, the inclination of the actual caliper pressure in the sudden pressure increase control of this time can be made gentler than that of the last time. As a result, it is possible to suppress excessive pressure increase due to various factors, such as the breakdown of the pressure sensor 91 or a situation that the inlet valve 1 has a characteristic of being opened easily.

More specifically, in this embodiment, the sudden pressure increase controlling section 21d is configured so as to lower the locking-equivalent hydraulic pressure RP on the basis of the following expressions (1) to (3) and the sudden pressure increase ratio calculation table shown in FIG. 12.

$$RP = (CP1-CP3) \times RA \quad (1)$$

$$RA = SV + CV \quad (2)$$

$$CV = CVp + RAb \quad (3)$$

RP: locking-equivalent hydraulic pressure
CP1: estimated caliper pressure at the start time of pressure decrease of the last time
CP3: estimated caliper pressure at the start time of pressure increase
RA: sudden pressure increase ratio
SV: initial value (constant)
CV: correction amount
CVp: correction amount of the last time
RAb: table calculation value The sudden pressure increase ratio RA is obtained by adding the correction amount CV to the initial value SV, and the correction amount CV is obtained by adding the table calculation value shown in FIG. 12 to the correction amount CVp of the last time. The magnitude relationship among the values shown in FIG. 12 is herein represented by $-\alpha 1 < 0 < \alpha 1 < \alpha 2 < \alpha 3 <$, $\Delta P1 < \Delta P2 < \Delta P3$, and $T1 < T2 < T3 < T4$. More specifically, as the pressure increase time TU of the last time is shorter, a larger value is selected as the table calculation amount RAb. As a result, the locking-equivalent hydraulic pressure RP is calculated as a small value. Furthermore, as the pressure decrease amount ΔP in the pressure decrease control of the last time is larger, a larger value is selected as the table calculation amount RAb. As a result, the sudden pressure increase ratio RA also becomes large and the locking-equivalent hydraulic pressure RP is calculated as a small value.

As shown in FIGS. 10 and 11, the gradual pressure increase controlling section 21c sets the reference hydraulic pressure for performing first gradual pressure increase control (between time t3 to t4) for raising the estimated caliper pressure from the break point target value CP4 to the target indication pressure CP2 at the second inclination G2 being gentler than the first inclination G1 and for performing second gradual pressure increase control (between time t4 to t5) for raising the estimated caliper pressure from the target indication pressure CP2 to the pressure at the end time of the pressure increase at the third inclination G3 being gentler than the second inclination G2.

Furthermore, the gradual pressure increase controlling section 21e sets the indication hydraulic pressure so the indication hydraulic pressure follows the reference hydraulic pressures having been set in the first gradual pressure increase control and the second gradual pressure increase control (between time t3 to t5). Then, the antilock brake control module 21 calculates the current value for controlling the inlet valve 1 on the basis of the set indication hydraulic pressure and the master cylinder pressure and then outputs the current value to the valve drive module 22. In the pressure decrease control and the holding control, the antilock brake control module 21 determines the current value to be applied to the inlet valve 1 or the output valve 2 using a known method and outputs the current value to the valve drive module 22.

The valve drive module 22 controls the inlet valve 1 and the output valve 2 on the basis of the current value output from the antilock brake control module 21.

The storage module 23 stores the above-mentioned sudden pressure increase ratio calculation table (refer to FIG. 12), the expressions (1) to (3), etc.

Figure 13:
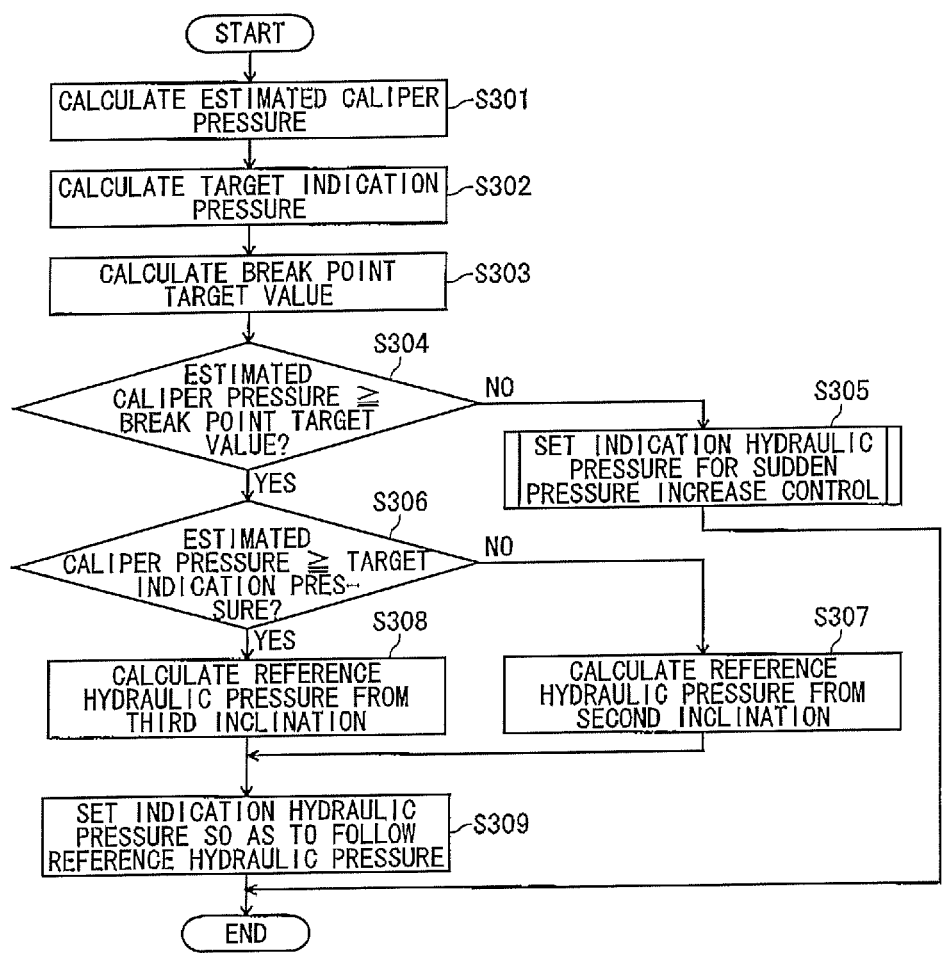
FIG. 13 shows a method for setting indication hydraulic pressure in pressure increase control.
Figure 14:
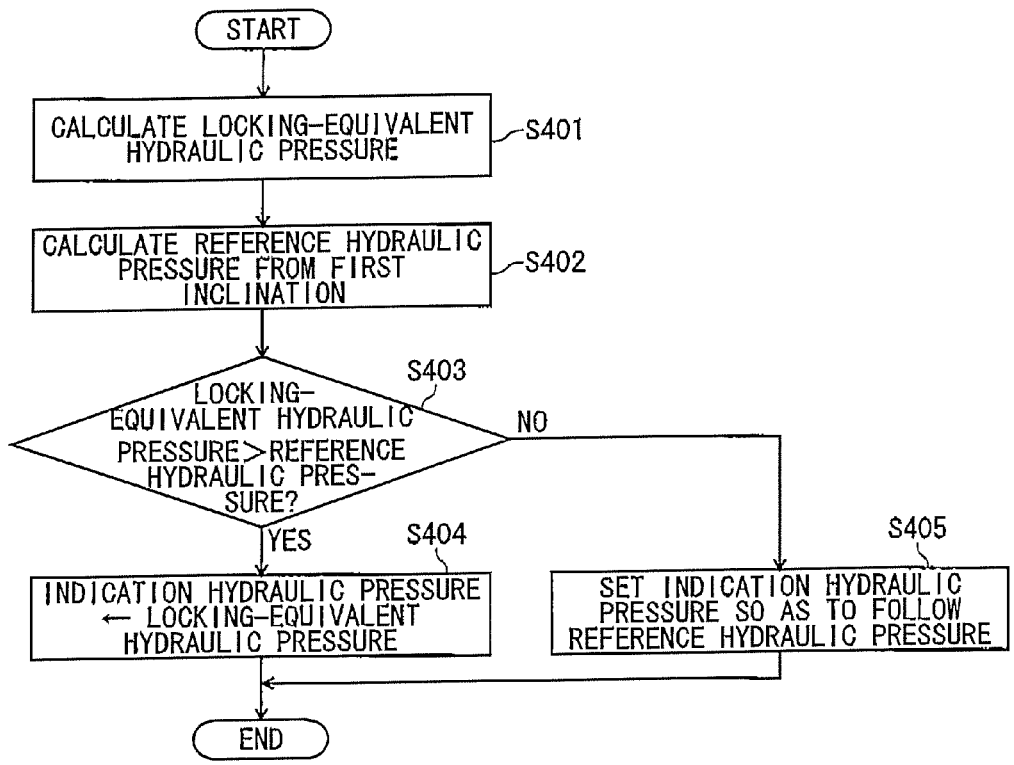
FIG. 14 shows a method for setting indication hydraulic pressure in sudden pressure increase control.

Next, the method for setting the indication hydraulic pressure at the time of the pressure increase control using the antilock brake control module 21 will be described below in detail refer to FIGS. 13 and 14.

The antilock brake control module 21 first calculates the estimated caliper pressure (at S301), calculates the target indication pressure (at S302) and calculates the break point target value (at S303). After step S303, the antilock brake control module 21 judges whether the estimated caliper pressure is equal to or more than the break point target value (at S304).

At step S304, in the case that the estimated caliper pressure is not equal to or more than the break point target value (No), the control to be performed by the antilock brake control module 21 is shifted to the control for setting the indication hydraulic pressure for the sudden pressure increase control (at S305). At this step S305, the antilock brake control module 21 first calculates the locking-equivalent hydraulic pressure (at S401) and calculates the reference hydraulic pressure from the first inclination (at S402) as shown in FIG. 14.

After step S402, the antilock brake control module 21 judges whether the locking-equivalent hydraulic pressure is more than the reference hydraulic pressure (at S403). In the case that the locking-equivalent hydraulic pressure is more than the reference hydraulic pressure at step S403 (Yes), the antilock brake control module 21 sets the locking-equivalent hydraulic pressure as the indication hydraulic pressure (at S404). In the case that the locking-equivalent hydraulic pressure is not more than the reference hydraulic pressure (No), the antilock brake control module 21 sets the indication hydraulic pressure so that the indication hydraulic pressure follows the reference hydraulic pressure (at S405). After step S404 or step S405, the control to be performed by the antilock brake control module 21 returns to the processing of FIG. 13, and the control is ended.

At step S304, in the case that the estimated caliper pressure is equal to or more than the break point target value (Yes), the antilock brake control module 21 judges whether the estimated caliper pressure is equal to or more than the target indication pressure (at S306). At step S306, in the case that the estimated caliper pressure is not equal to or more than the target indication pressure (No), the antilock brake control module 21 calculates the reference hydraulic pressure from the second inclination (at S307).

Furthermore, at step S306, in the case that the estimated caliper pressure is equal to or more than the target indication pressure (Yes), the antilock brake control module 21 calculates the reference hydraulic pressure from the third inclination (at S308). After step S308 or step S309, the antilock brake control module 21 sets the indication hydraulic pressure so that the indication hydraulic pressure follows the calculated reference hydraulic pressure (at S309), and the control is ended.

Next, an example of the antilock brake control using the antilock brake control module 21 will be described below in detail. More specifically, the antilock brake control to be performed when the estimated caliper pressure becomes different from the actual caliper pressure due to the breakdown of the pressure sensor 91, for example, will be described.

Figure 15:
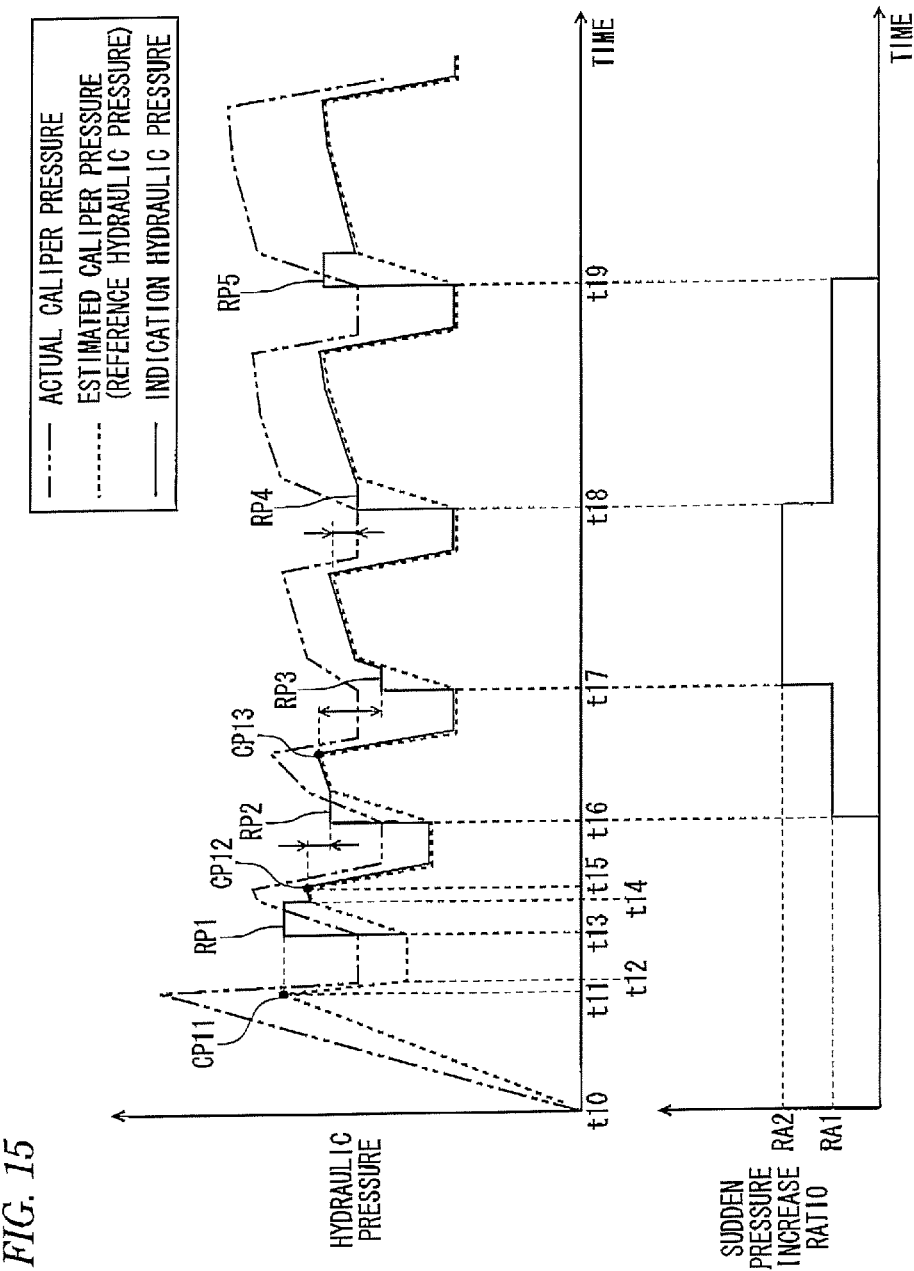
FIG. 15 shows a time chart exemplifying antilock brake control.

As shown in FIG. 15, when the driver depresses the brake pedal P (at time t10), the actual caliper pressure rises at an inclination larger than that of the estimated caliper pressure due to the breakdown of the pressure sensor 91, for example. Then, when the pressure decrease conditions are satisfied, the pressure decrease control is started by the antilock brake control module 21 (at time t11).

After the pressure decrease control, when holding control conditions are satisfied, the holding control is performed (at time t12), and then when the pressure increase control conditions are satisfied, first pressure increase control is performed (at time t13). Since the pressure increase time and the pressure decrease amount of the last time are not obtained in this first pressure increase control, the antilock brake control module 21 directly sets the hydraulic pressure CP11 at the start time of the pressure decrease of the last time (at time t11) to a locking-equivalent hydraulic pressure RP1 without referring to the expressions (1) to (3) and the sudden pressure increase ratio calculation table described above. More specifically, in the first pressure increase control, the antilock brake control module 21 always sets the locking-equivalent hydraulic pressure RP1 to the hydraulic pressure CP11 at the start time of the pressure decrease of the last time.

Then, the antilock brake control module 21 sets the locking-equivalent hydraulic pressure RP1 being higher than the reference hydraulic pressure as the indication hydraulic pressure and performs the sudden pressure increase control (between time t13 to t14). After the sudden pressure increase control, the control module 21 sets the reference hydraulic pressure to the indication hydraulic pressure and performs the first gradual pressure increase control (between time t14 to t15).

Then, in a similar way as described above, after the pressure decrease control and the holding control are performed, the pressure increase control of the second time is started (at time t16). Furthermore, in the pressure increase control of the second time, the antilock brake control module 21 calculates the sudden pressure increase ratio RA1 on the basis of the pressure increase time and the pressure decrease amount of the last time, for example. As a result, the locking-equivalent hydraulic pressure is set to a value RP2 that is smaller than the hydraulic pressure CP12 at the start time of the pressure decrease control of the last time on the basis of the sudden pressure increase ratio RA1.

Then, in the pressure increase control of the third time (at time t17), when the antilock brake control module 21 calculates a sudden pressure increase ratio RA2 being larger than the sudden pressure increase ratio RA1 of the last time, the locking-equivalent hydraulic pressure is set to a value RP3 obtained by decreasing the hydraulic pressure CP13 at the start time of the pressure decrease of the last time at a large ratio. Since the locking-equivalent hydraulic pressure is changed to smaller values in the pressure increase control of the second time and the third time as described above, the inclination of the actual caliper pressure at the time of the sudden pressure increase control can be made gentler gradually, whereby excessive pressure increase can be suppressed.

Then, when the pressure increase time and the pressure decrease amount of the last time return to appropriate values gradually, the sudden pressure increase ratio RA becomes smaller gradually in the pressure increase control of the fourth time and the fifth time (at time t18 and time t19), whereby the locking-equivalent hydraulic pressure returns to larger values RP4 and RP5 gradually. As a result, the inclination of the actual caliper pressure at the time of the sudden pressure increase control becomes larger gradually, and proper braking control is accomplished.

While the second embodiment has been described above, it can be variously modified without departing from the scope of the present invention.

In the above-mentioned embodiment, the sudden pressure increase control, the reference hydraulic pressure is compared with the locking-equivalent hydraulic pressure RP and the higher pressure is set as the indication hydraulic pressure. However, for example, the sudden pressure increase control may be performed by using only the locking-equivalent hydraulic pressure without setting the reference hydraulic pressure. In this case, when the estimated caliper pressure has reached the break point target value, the gradual pressure increase control should only be performed depending on the reference hydraulic pressure.

Furthermore, in the case that no reference hydraulic pressure is set in the sudden pressure increase control as described above, instead of limiting the indication hydraulic pressure to a value obtained by adding the limit value LM to the reference hydraulic pressure as in the case of the above-mentioned embodiment, the indication hydraulic pressure should only be limited to a value obtained by adding the limit value to the hydraulic pressure at the start time of the pressure increase.

In the above-mentioned embodiment, the locking-equivalent hydraulic pressure is lowered on the basis of the sudden pressure increase ratio. However, the locking-equivalent hydraulic pressure may always be set to the hydraulic pressure at the start time of the pressure decrease of the last time without using the sudden pressure increase ratio.

In the above-mentioned embodiment, the gradual pressure increase control is performed using the two inclinations G2 and G3. However, the control may be performed by using one inclination or by using three or more inclinations.

Although the vehicle brake fluid pressure controller for performing only the antilock brake control has been exemplified in the above-mentioned embodiment for the sake of simplicity, the control may be combined with other control techniques, such as vehicle attitude control and brake assisting control, by appropriately adding control valves.

The invention claimed is:
1. A vehicle brake fluid pressure controller comprising:
a normally-open proportional solenoid valve provided in a hydraulic passage extending from a hydraulic pressure source to a wheel brake;
a normally-closed solenoid valve provided in a hydraulic passage extending from the wheel brake to the hydraulic pressure source;
an antilock brake control module configured to perform an antilock brake control for suppressing the locking of a wheel by performing a pressure increase control, a pressure decrease control and a pressure holding control for a hydraulic pressure of the wheel brake, using the normally-open proportional solenoid valve and the normally-closed solenoid valve; and
a sudden braking judging module configured to judge whether a sudden braking is performed,
wherein, in the case that the sudden braking judging module judges that the sudden braking is performed, the antilock brake control module:
fully closes the normally-open proportional solenoid valve for the front wheel brake during when the hydraulic pressure is being increased due to the sudden braking;
then performs the holding control for a first predetermined time; and
then performs the pressure increase control at a predetermined inclination by applying a current to the normally-open proportional solenoid valve until the pressure decrease control is started.

2. The controller of claim 1,
wherein the predetermined inclination is adjusted to become gradually steeper.

3. The controller of claim 1,
wherein, in the case that the pressure decrease control is not performed even after a second predetermined time has passed after the pressure increase control is started at the predetermined inclination, the antilock brake control module fully opens the normally-open proportional solenoid valve.

4. The controller of claim 1,
wherein the sudden braking judging module judges whether the sudden braking is performed on the basis of a change in a wheel velocity.

5. The controller of claim 1,
wherein the sudden braking judging module judges whether the sudden braking is performed on the basis of whether a wheel deceleration exceeds a threshold value, while changing the threshold value to a side in which the wheel deceleration becomes larger in an absolute value depending on a time elapsed from when the wheel deceleration reaches a predetermined value in the absolute value.

6. The controller of claim 1,
wherein the antilock brake control module includes a slip ratio calculation section and a pressure control judgment section, and wherein the slip ratio calculation section calculates a slip ratio SL of the wheel based on an output from a wheel velocity sensor, and outputs the slip ratio to the pressure control judgment section.

7. The controller of claim 6,
wherein a pressure control judgment section judges whether a brake fluid pressure of the wheel should be set to a pressure decrease state, a pressure increase state or a holding state on a basis of wheel acceleration estimated from a wheel velocity and the slip ratio SL.

8. The controller of claim 7,
wherein in a case that the slip ratio SL becomes larger than a predetermined threshold value and that the wheel acceleration is equal to or less than 0, the pressure control judgment section judges that the wheel is likely to lock and determines that a caliper pressure should be set to the pressure decrease state,
wherein in a case that the wheel acceleration is more than 0, the pressure control judgment section determines that the caliper pressure should be set to the holding state, and
wherein in a case that the slip ratio becomes equal to or less than the predetermined threshold value and that the wheel acceleration is equal to or less than 0, the pressure control judgment section determines that the caliper pressure should be set to the pressure increase state.

9. The controller of claim 8,
wherein the pressure control judgment section includes a temporary holding control section which performs the pressure holding control for the first predetermined time corresponding to a threshold value by fully closing the normally-open proportional solenoid valve corresponding to the front wheel brake when the pressure is increasing due to sudden braking in the case that the sudden braking judging module judges that sudden braking is performed.

10. The controller of claim 9,
wherein the pressure control judgment section includes a gradual pressure increase control section which increases the pressure at the predetermined inclination by controlling the current to be applied to the normally-open proportional solenoid valve immediately after temporal holding control is performed by a temporary holding control section.

11. The controller of claim 10,
wherein the gradual pressure increase control section sets the pressure increase inclination so that the inclination becomes larger gradually depending on a count value of a pressure control timer, and
wherein the gradual pressure increase control section stops the gradual pressure increase and fully opens the normally-open proportional solenoid valve in the case that the count value of the pressure control timer exceeds a predetermined value.

12. The controller of claim 11,
wherein the pressure decrease control is not performed after a second predetermined time has passed after the gradual pressure increase control is started such that even if a mistake is made in the judgment of the sudden braking, control is returned to ordinary ABS control.

13. The controller of claim 12,
wherein the temporal holding control and the gradual pressure increase control are performed only for front wheels.

14. The controller of claim 13,
wherein the sudden braking judging module judges whether the sudden braking is performed depending on whether an absolute value of wheel deceleration exceeds a sudden braking judgment threshold value.

15. The controller of claim 14,
wherein a threshold value setting timer counts a time elapsed after the absolute value of wheel deceleration becomes equal to or more than a predetermined value, and
wherein the threshold value setting timer counts a count value TM1 only when the wheel acceleration is decreasing.

16. The controller of claim 15,
wherein a threshold value setting section sets the sudden braking judgment threshold value depending on the count value of the threshold value setting timer,
wherein the threshold value becomes smaller stepwise as the count value TM1 increases, and
wherein the sudden braking judgment threshold value is changed to a side in which the absolute value of the deceleration is larger depending on the count value TM1 elapsed from a time when the absolute value of the wheel deceleration becomes equal to or more than the predetermined value.

17. A vehicle brake fluid pressure controller comprising:
a normally-open proportional solenoid valve provided in a hydraulic passage extending from a hydraulic pressure source to a wheel brake;
a normally-closed solenoid valve provided in a hydraulic passage extending from the wheel brake to the hydraulic pressure source; and
an antilock brake control module configured to perform an antilock brake control for suppressing the locking of a wheel by performing a pressure increase control, a pressure decrease control and a pressure holding control for a hydraulic pressure of the wheel brake, using the normally-open proportional solenoid valve and the normally-closed solenoid valve,
wherein, in the pressure increase control, the antilock brake control module performs a sudden pressure increase control for raising the hydraulic pressure at a first inclination until it reaches a break point target value and performs a gradual pressure increase control for raising the hydraulic pressure at a second inclination gentler than the first inclination after it has reached the break point target value, and
wherein, at a start time of the sudden pressure increase control, the antilock brake control module sets an indication hydraulic pressure for controlling the normally-open proportional solenoid valve to a locking-equivalent hydraulic pressure which is equivalent to the hydraulic pressure at a start time of the pressure decrease control of the last time.

18. The controller of claim 17,
wherein, in the case that a difference between the hydraulic pressure at the start time of the sudden pressure increase control and the locking-equivalent hydraulic pressure is equal to or more than a predetermined limit value at the start time of the sudden pressure increase control, the antilock brake control module limits the indication hydraulic pressure to a value obtained by adding a limit value to the hydraulic pressure at the start time of the sudden pressure increase control.

19. The controller of claim 17,
wherein, in the case that a time in which the pressure increase control of the last time is performed is shorter than a predetermined time, the antilock brake control module makes the locking-equivalent hydraulic pressure to be lower than the hydraulic pressure at the start time of the pressure decrease control of the last time.

20. The controller of claim 17,
wherein, in the case that a pressure decrease amount in the pressure decrease control of the last time is larger than a predetermined value, the antilock brake control module makes the locking-equivalent hydraulic pressure to be lower than the hydraulic pressure at the start time of the pressure decrease control of the last time.

* * * * *